(12) United States Patent
Bruinooge et al.

(10) Patent No.: US 12,139,295 B2
(45) Date of Patent: Nov. 12, 2024

(54) CONTAINER PREFORM

(71) Applicant: NIAGARA BOTTLING, LLC, Diamond Bar, CA (US)

(72) Inventors: Peter N. Bruinooge, Chino, CA (US); Mohammad Adom Safiullah, Chino Hills, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

(21) Appl. No.: 17/693,114

(22) Filed: Mar. 11, 2022

(65) Prior Publication Data

US 2022/0288834 A1 Sep. 15, 2022

Related U.S. Application Data

(60) Provisional application No. 63/160,371, filed on Mar. 12, 2021.

(51) Int. Cl.
 *B65D 1/02* (2006.01)
(52) U.S. Cl.
 CPC .... *B65D 1/0246* (2013.01); *B29C 2949/0746* (2022.05); *B29C 2949/075* (2022.05);
 (Continued)
(58) Field of Classification Search
 CPC . B29C 49/04112; B29C 49/065; B29C 49/07; B29C 49/071; B29C 49/0715;
 (Continued)

(56) References Cited

U.S. PATENT DOCUMENTS 3,029,963 A 4/1962 Evers
3,438,578 A 4/1969 Peterson et al.
(Continued)

FOREIGN PATENT DOCUMENTS

CN 1473102 A 2/2004
DE 102012001229 A1 7/2013
(Continued)

OTHER PUBLICATIONS

International Search Report with Written Opinion for related Application No. PCT/US2022/020044 dated May 31, 2022 (17 Pages).

*Primary Examiner* — James C Yager
(74) *Attorney, Agent, or Firm* — Michael, Best & Friedrich LLP

(57) ABSTRACT

A preform configured to be blow-molded into a plastic bottle includes a neck section defining an opening, the neck section including a threaded portion configured to engage a closure, and a neck ring, a transition section having a first end positioned adjacent to the neck ring and a second end opposite the first end, a cylindrical body section extending from the second end of the transition section to a base, and a longitudinal axis extending from the opening through the base. The neck section, transition section, and the body section define a hollow channel positioned between the opening and the base. The transition section defines a tapered sidewall relative to the longitudinal axis, the tapered sidewall decreases a cross-sectional diameter of the hollow channel. The tapered sidewall of the transition section contains 20% to 30% of a total weight of the preform.

20 Claims, 4 Drawing Sheets

(52) U.S. Cl.
CPC .. *B29C 2949/08* (2022.05); *B29C 2949/0817* (2022.05); *B29C 2949/0872* (2022.05); *B65D 2501/0036* (2013.01)

(58) Field of Classification Search
CPC ......... B29C 49/072; B29C 2049/04112; B29C 2049/065; B29C 2949/24; B29B 11/08; B29B 11/14; B29L 2031/7158; B65D 1/02; B65D 1/0215; B65D 1/023; Y10T 428/1352; Y10T 428/1397
USPC .......................... 428/35.7, 36.9, 36.91, 36.92
See application file for complete search history.

(56) References Cited

U.S. PATENT DOCUMENTS

| | | |
|---|---|---|
| D252,530 S | 7/1979 | Budish |
| 4,316,551 A | 2/1982 | Belokin, Jr. |
| 4,374,878 A | 2/1983 | Jakobsen et al. |
| D294,462 S | 3/1988 | Ota et al. |
| 4,756,439 A | 7/1988 | Perock |
| 4,818,213 A | 4/1989 | Roy |
| 4,818,575 A | 4/1989 | Hirata et al. |
| 4,847,129 A | 7/1989 | Collette et al. |
| 4,863,046 A | 9/1989 | Collette et al. |
| 4,907,709 A | 3/1990 | Abe et al. |
| 4,927,680 A | 5/1990 | Collette et al. |
| 4,948,001 A | 8/1990 | Magly |
| D315,869 S | 4/1991 | Collette |
| D321,830 S | 11/1991 | York et al. |
| 5,067,622 A | 11/1991 | Garver et al. |
| 5,092,475 A | 3/1992 | Krishnakumar et al. |
| 5,133,468 A | 7/1992 | Brunson et al. |
| 5,178,289 A | 1/1993 | Krishnakumar et al. |
| 5,199,588 A | 4/1993 | Hayashi |
| 5,255,889 A | 10/1993 | Collette et al. |
| 5,279,433 A | 1/1994 | Krishnakumar et al. |
| 5,281,387 A | 1/1994 | Collette et al. |
| D345,693 S | 4/1994 | Edstrom |
| 5,303,833 A | 4/1994 | Hayashi et al. |
| 5,303,834 A | 4/1994 | Krishnakumar et al. |
| 5,337,909 A | 8/1994 | Vailliencourt |
| 5,341,946 A | 8/1994 | Vailliencourt et al. |
| D352,238 S | 11/1994 | Vailliencourt et al. |
| D352,245 S | 11/1994 | Krishnakumar et al. |
| 5,366,774 A | 11/1994 | Pinto et al. |
| 5,381,910 A | 1/1995 | Sugiura et al. |
| 5,407,086 A | 4/1995 | Ota et al. |
| D358,766 S | 5/1995 | Vailliencourt et al. |
| 5,411,699 A | 5/1995 | Collette et al. |
| D364,565 S | 11/1995 | Vailliencourt et al. |
| D366,416 S | 1/1996 | Semersky |
| D366,417 S | 1/1996 | Semersky |
| 5,632,397 A | 5/1997 | Fandeux et al. |
| 5,645,183 A * | 7/1997 | Slat .................. B32B 27/08 215/374 |
| 5,669,520 A | 9/1997 | Simpson |
| 5,704,503 A | 1/1998 | Krishnakumar et al. |
| D391,168 S | 2/1998 | Qqq |
| D393,802 S | 4/1998 | Collette et al. |
| 5,762,221 A | 6/1998 | Tobias et al. |
| D397,614 S | 9/1998 | Krishnakumar et al. |
| D402,895 S | 12/1998 | Takahashi et al. |
| D404,308 S | 1/1999 | Takahashi et al. |
| 5,888,598 A | 3/1999 | Brewster et al. |
| D407,649 S | 4/1999 | McCallister et al. |
| D407,650 S | 4/1999 | Takahashi et al. |
| D411,453 S | 6/1999 | Piccioli et al. |
| 5,908,128 A | 6/1999 | Krishnakumar et al. |
| D413,519 S | 9/1999 | Eberle et al. |
| 5,971,184 A | 10/1999 | Krishnakumar et al. |
| 5,988,417 A | 11/1999 | Chena et al. |
| 6,016,932 A | 1/2000 | Gaydosh et al. |
| D419,882 S | 2/2000 | Bretz et al. |
| D420,592 S | 2/2000 | Bretz et al. |
| 6,036,037 A | 3/2000 | Scheffer et al. |
| D423,365 S | 4/2000 | Eberle et al. |
| 6,044,996 A | 4/2000 | Carew et al. |
| 6,044,997 A | 4/2000 | Oaa |
| 6,062,409 A | 5/2000 | Eberle |
| D426,460 S | 6/2000 | Krishnakumar et al. |
| D427,905 S | 7/2000 | Eberle |
| 6,092,688 A | 7/2000 | Eberle et al. |
| D429,647 S | 8/2000 | Warner et al. |
| D430,493 S | 9/2000 | Weick |
| 6,112,925 A | 9/2000 | Nahill et al. |
| 6,113,841 A * | 9/2000 | Nielsen .................. B29C 49/78 425/169 |
| D434,330 S | 11/2000 | Rowe et al. |
| D440,157 S | 4/2001 | Lichtman et al. |
| D440,158 S | 4/2001 | Bretz et al. |
| D440,877 S | 4/2001 | Lichtman et al. |
| D441,294 S | 5/2001 | Lichtman et al. |
| 6,230,912 B1 | 5/2001 | Rashid |
| 6,248,413 B1 | 6/2001 | Barel et al. |
| D445,033 S | 7/2001 | Bretz et al. |
| 6,257,433 B1 | 7/2001 | Ogg et al. |
| D446,126 S | 8/2001 | Bretz et al. |
| D447,411 S | 9/2001 | Lichtman et al. |
| 6,296,131 B2 | 10/2001 | Rashid |
| 6,347,717 B1 | 2/2002 | Eberle |
| D454,500 S | 3/2002 | Bretz et al. |
| D465,158 S | 11/2002 | Peek et al. |
| D466,021 S | 11/2002 | Thieriunq et al. |
| D466,819 S | 12/2002 | Darr et al. |
| 6,494,333 B2 | 12/2002 | Sasaki et al. |
| D469,358 S | 1/2003 | Bryant et al. |
| D469,359 S | 1/2003 | Bryant et al. |
| D469,695 S | 2/2003 | Brvant et al. |
| D469,696 S | 2/2003 | Brvant et al. |
| D470,773 S | 2/2003 | Darr et al. |
| D472,470 S | 4/2003 | Bretz et al. |
| 6,554,146 B1 | 4/2003 | DeGroff et al. |
| D476,236 S | 6/2003 | Unqradv et al. |
| 6,585,125 B1 | 7/2003 | Peek |
| D479,690 S | 9/2003 | DeGroff |
| 6,616,001 B2 | 9/2003 | Saito et al. |
| D480,957 S | 10/2003 | Mooney et al. |
| D485,765 S | 1/2004 | Thieriunq et al. |
| 6,682,794 B1 | 1/2004 | Horn et al. |
| 6,722,514 B2 | 4/2004 | Renz |
| 6,739,467 B2 | 5/2004 | Saito et al. |
| D494,475 S | 8/2004 | Thieriunq et al. |
| D497,551 S | 10/2004 | Gamel et al. |
| 6,830,158 B2 | 12/2004 | Yourist |
| 6,841,262 B1 | 1/2005 | Beck et al. |
| D502,108 S | 2/2005 | Gamel et al. |
| D503,625 S | 4/2005 | Nelson et al. |
| D503,885 S | 4/2005 | Bretz et al. |
| D504,063 S | 4/2005 | Bretz et al. |
| D506,675 S | 6/2005 | Bretz et al. |
| D506,676 S | 6/2005 | Bretz et al. |
| D506,677 S | 6/2005 | Bretz et al. |
| D507,491 S | 7/2005 | Bretz et al. |
| D507,609 S | 7/2005 | Bretz et al. |
| D507,749 S | 7/2005 | Bretz et al. |
| D508,857 S | 8/2005 | Bretz et al. |
| 6,932,230 B2 | 8/2005 | Pedmo et al. |
| D510,526 S | 10/2005 | Bretz et al. |
| 7,025,219 B2 | 4/2006 | Heisner et al. |
| 7,032,770 B2 | 4/2006 | Finlav et al. |
| 7,033,656 B2 | 4/2006 | Nahil et al. |
| D525,530 S | 7/2006 | Livingston et al. |
| D527,643 S | 9/2006 | Gottlieb |
| 7,172,087 B1 | 2/2007 | Axe et al. |
| D538,660 S | 3/2007 | Gatewood |
| 7,198,164 B2 | 4/2007 | Yourist et al. |
| D548,106 S | 8/2007 | Martinez et al. |
| 7,258,244 B2 | 8/2007 | Unqradv |
| D551,081 S | 9/2007 | Ohara et al. |
| 7,267,242 B2 | 9/2007 | Tanaka et al. |
| D555,499 S | 11/2007 | Ross |
| 7,334,695 B2 | 2/2008 | Bvsick et al. |
| 7,334,696 B2 | 2/2008 | Tanaka et al. |

(56) References Cited

U.S. PATENT DOCUMENTS

| | | |
|---|---|---|
| 7,347,339 B2 | 3/2008 | Banqi et al. |
| 7,364,046 B2 | 4/2008 | Joshi et al. |
| 7,416,089 B2 | 8/2008 | Kraft et al. |
| 7,416,090 B2 | 8/2008 | Mooney et al. |
| D579,339 S | 10/2008 | Shmagin |
| 7,451,886 B2 | 11/2008 | Lisch et al. |
| D584,627 S | 1/2009 | Leooitevin |
| D598,779 S | 8/2009 | Leooitevin |
| D610,015 S | 2/2010 | Yourist et al. |
| 7,694,842 B2 | 4/2010 | Melrose |
| 7,699,183 B2 | 4/2010 | Matsuoka et al. |
| 7,748,551 B2 | 7/2010 | Gatewood et al. |
| 7,748,552 B2 | 7/2010 | Livinqston et al. |
| 7,757,874 B2 | 7/2010 | Ross |
| D621,271 S | 8/2010 | Soni |
| 7,780,025 B2 | 8/2010 | Simpson, Jr. et al. |
| D623,529 S | 9/2010 | Yourist et al. |
| D624,427 S | 9/2010 | Yourist et al. |
| 7,798,349 B2 | 9/2010 | Maczek et al. |
| D630,515 S | 1/2011 | Bretz et al. |
| 7,861,876 B2 | 1/2011 | Stowitts |
| 7,927,678 B2 | 4/2011 | Mitadera et al. |
| 7,980,404 B2 | 7/2011 | Trude et al. |
| 8,020,717 B2 | 9/2011 | Patel |
| 8,047,388 B2 | 11/2011 | Kelley et al. |
| 8,091,720 B2 | 1/2012 | Colloud |
| 8,308,007 B2 | 11/2012 | Mast et al. |
| 8,328,033 B2 | 12/2012 | Mast |
| 8,381,496 B2 | 2/2013 | Trude et al. |
| 8,728,601 B2 | 5/2014 | Hutts et al. |
| 9,994,350 B2 | 6/2018 | Labadie et al. |
| 10,118,724 B2 | 11/2018 | Hanan |
| 10,329,043 B2 | 6/2019 | Hanan |
| 10,647,465 B2 | 5/2020 | Hanan |
| 10,829,260 B2 | 11/2020 | Hanan |
| 11,142,364 B2 | 10/2021 | Hanan |
| 2001/0030166 A1 | 10/2001 | Ozawa et al. |
| 2002/0037338 A1 | 3/2002 | Lisch et al. |
| 2002/0090473 A1 | 7/2002 | Lee et al. |
| 2004/0000533 A1 | 1/2004 | Kamineni et al. |
| 2005/0279728 A1 | 12/2005 | Finlay et al. |
| 2006/0065992 A1 | 3/2006 | Hutchinson et al. |
| 2006/0070977 A1 | 4/2006 | Howell et al. |
| 2006/0113274 A1 | 6/2006 | Keller et al. |
| 2006/0118508 A1 | 6/2006 | Kraft et al. |
| 2006/0131257 A1 | 6/2006 | Gatewood et al. |
| 2006/0157439 A1 | 7/2006 | Howell |
| 2006/0255235 A1 | 11/2006 | Meyer et al. |
| 2007/0131644 A1 | 6/2007 | Melrose |
| 2007/0210026 A1 | 9/2007 | Darr et al. |
| 2008/0087628 A1 | 4/2008 | Bangi et al. |
| 2008/0257855 A1 | 10/2008 | Patel |
| 2009/0020497 A1 | 1/2009 | Tanaka et al. |
| 2009/0065468 A1 | 3/2009 | Hata et al. |
| 2009/0159556 A1 | 6/2009 | Patcheak et al. |
| 2009/0166314 A1 | 7/2009 | Matsuoka |
| 2009/0184127 A1 | 7/2009 | Mooney |
| 2009/0188888 A1 | 7/2009 | Penny |
| 2009/0261058 A1 | 10/2009 | Pritchett, Jr. |
| 2009/0261059 A1 | 10/2009 | Pritchett, Jr. |
| 2009/0266785 A1 | 10/2009 | Sieal |
| 2009/0283495 A1 | 11/2009 | Lane et al. |
| 2009/0321383 A1 | 12/2009 | Lane |
| 2010/0023378 A1 | 1/2010 | Ratnam |
| 2010/0028577 A1 | 2/2010 | Siegl |
| 2010/0089865 A1 | 4/2010 | Oauchi et al. |
| 2010/0163513 A1 | 7/2010 | Pedmo |
| 2010/0176081 A1 | 7/2010 | Kamineni et al. |
| 2010/0178148 A1 | 7/2010 | Forsthoevel et al. |
| 2010/0206837 A1 | 8/2010 | Deemer et al. |
| 2010/0206838 A1 | 8/2010 | Mast et al. |
| 2010/0206839 A1 | 8/2010 | Tanaka et al. |
| 2010/0206892 A1 | 8/2010 | Mast |
| 2010/0213204 A1 | 8/2010 | Melrose |
| 2010/0270259 A1 | 10/2010 | Russell et al. |
| 2010/0286837 A1 | 11/2010 | Jiao et al. |
| 2010/0304168 A1 | 12/2010 | Dambach |
| 2010/0304169 A1 | 12/2010 | Dambach |
| 2010/0314348 A1 | 12/2010 | Zoppas et al. |
| 2010/0320218 A1 | 12/2010 | Tanaka |
| 2011/0008560 A1 | 1/2011 | Dabbous et al. |
| 2011/0017700 A1 | 1/2011 | Patcheak et al. |
| 2011/0073559 A1 | 3/2011 | Schlies et al. |
| 2011/0115135 A1 | 5/2011 | Siegl |
| 2012/0027966 A1 | 2/2012 | Siegl |
| 2012/0031870 A1 | 2/2012 | Porter et al. |
| 2012/0132608 A1* | 5/2012 | Aoki .................. B29D 22/003 425/526 |
| 2012/0248003 A1 | 10/2012 | Hunter et al. |
| 2012/0263902 A1 | 10/2012 | Hanan |
| 2013/0147097 A1* | 6/2013 | Lane .................... B65D 1/0207 264/524 |
| 2014/0190927 A1 | 7/2014 | Lane |
| 2014/0346135 A1 | 11/2014 | Melrose |
| 2015/0027974 A1 | 1/2015 | Niec |
| 2015/0122766 A1 | 5/2015 | Hanan |
| 2015/0144587 A1 | 5/2015 | Hanan |
| 2016/0176566 A1 | 6/2016 | Hanan |
| 2016/0193750 A1 | 7/2016 | Gaiotti et al. |
| 2016/0257029 A1 | 9/2016 | Lane et al. |
| 2018/0327131 A1* | 11/2018 | Hanan .................. B29C 49/071 |
| 2018/0327132 A1 | 11/2018 | Hanan |
| 2019/0263554 A1 | 5/2019 | Hanan |
| 2020/0255179 A1 | 8/2020 | Hanan |
| 2022/0097895 A1 | 10/2022 | Hanan |
| 2023/0182949 A1 | 6/2023 | Hanan |

FOREIGN PATENT DOCUMENTS

| | | |
|---|---|---|
| EP | 0199576 A2 | 10/1986 |
| EP | 2325091 A1 | 5/2011 |
| FR | 2846946 B1 | 3/2005 |
| FR | 2899204 B1 | 6/2008 |
| JP | S5486560 A | 7/1979 |
| JP | S62164504 A | 7/1987 |
| JP | H07164436 A | 6/1995 |
| JP | H0848321 A | 2/1996 |
| JP | H09240647 A | 9/1997 |
| JP | H1029614 A | 2/1998 |
| JP | 2004090425 A | 3/2004 |
| JP | 2008189721 A | 8/2008 |
| JP | 2009045877 A | 3/2009 |
| JP | 2013510015 A | 3/2013 |
| JP | 2015182789 A | 10/2015 |
| KR | 20040059026 A | 6/2004 |
| WO | WO2004080828 A1 | 9/2004 |
| WO | WO2006005413 A1 | 1/2006 |
| WO | WO2006027092 A1 | 3/2006 |
| WO | WO2007033722 A1 | 3/2007 |
| WO | WO2007124894 A1 | 11/2007 |
| WO | WO2011160748 A1 | 12/2011 |
| WO | WO2012095285 A1 | 7/2012 |
| WO | WO2012156048 A1 | 11/2012 |
| WO | 2016103563 A1 | 6/2016 |
| WO | WO2017136584 A1 | 8/2017 |

* cited by examiner

CONTAINER PREFORM

CROSS-REFERENCE TO RELATED APPLICATIONS

This application claims priority to U.S. Provisional Patent Application No. 63/160,371, filed on Mar. 12, 2021 and titled "Container Preform," the entire contents of which is hereby incorporated by reference in its entirety.

FIELD OF THE DISCLOSURE

The present disclosure relates to plastic bottles. More specifically, the present disclosure is directed to embodiments of a preform configured to be blow-molded into a plastic bottle, the preforms facilitating improved top-load performance of the blown plastic bottles.

BACKGROUND OF THE DISCLOSURE

Plastic containers or bottles are used in the packaging of beverages. Plastic bottles are generally made by a process that includes injection molding a plastic preform, followed by blow-molding the plastic preform into the bottle. The preforms and bottles are generally formed of a plastic polymer, such as polyethylene terephthalate (PET).

SUMMARY

In one embodiment, a preform configured to be blow-molded into a plastic bottle includes a neck section defining an opening, the neck section including a threaded portion configured to engage a closure, and a neck ring, a transition section having a first end positioned adjacent to the neck ring and a second end opposite the first end, a cylindrical body section extending from the second end of the transition section to a base, and a longitudinal axis extending from the opening through the base. The neck section, transition section, and the body section define a hollow channel positioned between the opening and the base. The transition section defines a tapered sidewall relative to the longitudinal axis, the tapered sidewall decreases a cross-sectional diameter of the hollow channel. The tapered sidewall of the transition section contains 20% to 30% of a total weight of the preform.

In another embodiment, a preform for producing a plastic bottle includes a tubular body defining a hollow interior, the body defining the following components in sequence: a finish section defining an opening and a threaded portion, a neck ring, a transition section having a first end positioned adjacent to the neck ring and a second end opposite the first end, and a cylindrical body section extending from the second end of the transition section to a base, the base sealing the body at an end opposite the opening. A longitudinal axis extends from the opening through the base. The transition section defines a tapered sidewall relative to the longitudinal axis, the tapered sidewall decreases a cross-sectional diameter of the hollow interior. The tapered sidewall of the transition section contains more than 20% of a total weight of the preform.

Other aspects of the disclosure will become apparent by consideration of the detailed description and accompanying drawings.

Figure 1:
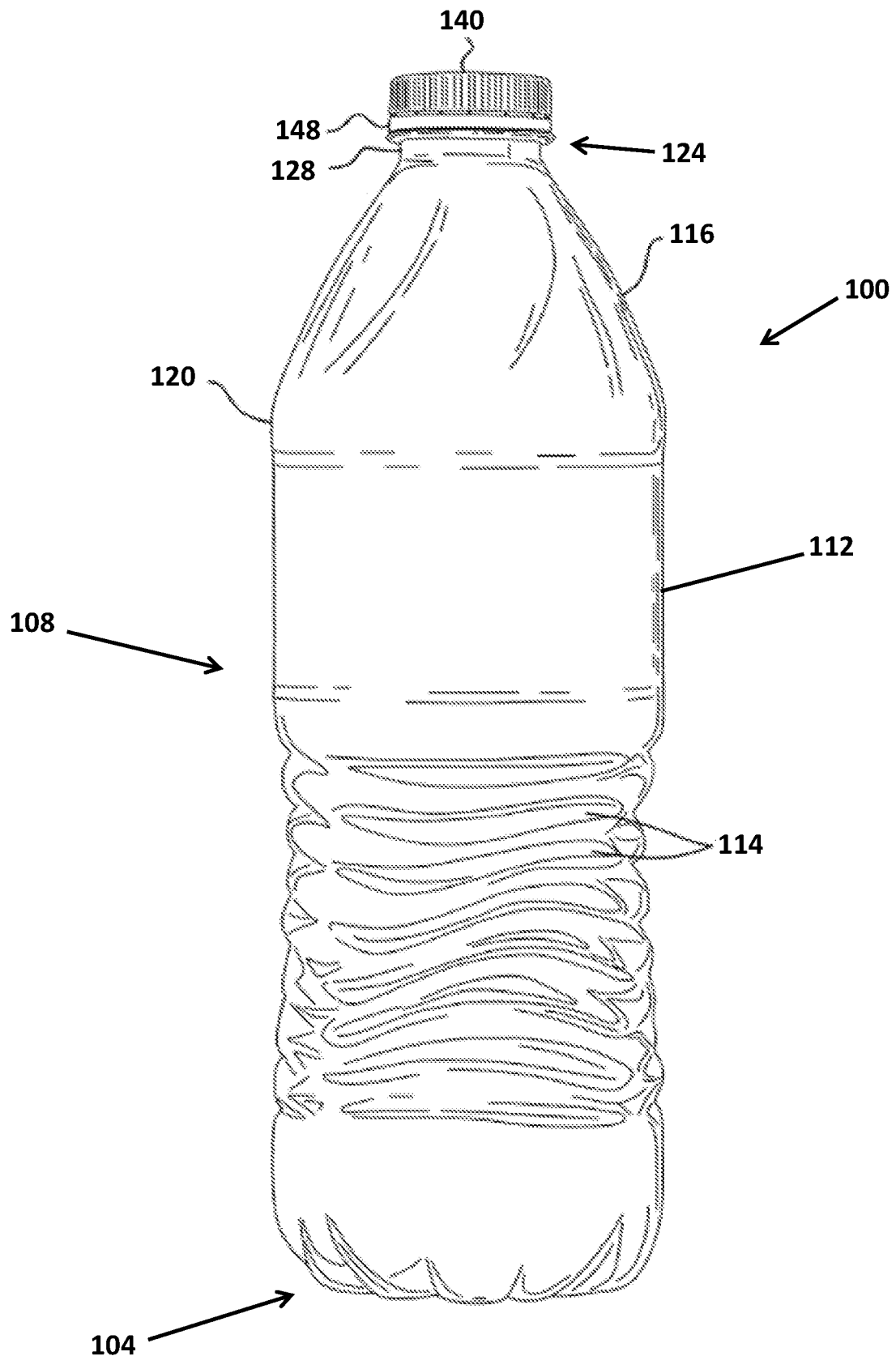
FIG. 1 is an elevation view of an example of an embodiment of a bottle.

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting.

DETAILED DESCRIPTION

The present disclosure is directed to an embodiment of a preform 200 configured to be blow-molded into a bottle 100. The preform 200 includes substantially more material (or plastic material) in a transition section 208 of the preform, which is positioned between a neck section 204/finish section 204 and a body section 212 of the preform 200. The transition section 208 includes 20% to 40% of the total material (by weight) (i.e., an amount of plastic) of the entire preform 200. Known preforms generally have approximately 10% to 15% of the total material (by weight). By distributing more material into the transition section 208 of the preform 200, the blow-molded bottle 100 has greater top load performance. In response to blow-molding, the transition section 208 forms a bell 116 of the bottle 100. The additional material positioned in the transition section 208 of the preform 200 provides additional material in the bell 116 of the bottle 100 after blow-molding, resulting in improved strength and top load performance of the bottle 100.

FIG. 1 illustrates an elevation (or side) view of an example of a container 100 used for storing liquid contents, such as a beverage (e.g., water, juice, a carbonated beverage, a noncarbonated beverage, tea, coffee, sports drink, etc.). The container 100, which is also referred to as a bottle 100 or a plastic bottle 100, includes a base 104 that extends upwards to a sidewall 108. In some embodiments, the base 104 can include a plurality of feet defined by a plurality of radial recesses oriented in a petaloid geometry. In other embodiments, the base 104 can include a substantially flat base without any feet. It should be appreciated that the base 104 can include other configurations or geometries, without limitation. The sidewall 108 can include a label panel portion 112. A label (not shown) is configured to attach to the label panel position 112, for example by an adhesive. The sidewall 108 can include a plurality of ribs 114. The ribs 114 can extend circumferentially around the sidewall 108 (or partially around the circumference of the sidewall 108) and can improve stiffness, rigidity, and/or provide hoop strength to the sidewall 108. The sidewall 108 transitions into a bell 116 at a shoulder 120. A finish 124 (or a finish portion 124) is coupled to the bell 116. The finish 124 includes a neck 128, a threaded portion 132 (shown in FIG. 2), and at least one annular bead 136 (or a neck ring 136 or a finish support ledge 136) (shown in FIG. 2). The bell 116 connects to the neck 128, connecting the finish 124 to the bell 116. The bell 116 includes a cross-sectional diameter that generally increases from the neck 128 to the shoulder 120. Stated another way, the bell 116 includes a cross-sectional diameter that generally decreases from the should 120 to the neck 128. The finish 124 is configured to receive a closure 140. The closure 140 (or cap 140) includes internal threads (not shown) configured to engage the threaded portion 132

(shown in FIG. 2) of the finish 124. The closure 140 is configured to selectively seal an opening 144 (shown in FIG. 2) of the finish 124. The opening 144 defines an opening for the bottle 100. The closure 140 can be connected to a tamper evident ring 148, which is retained by the neck ring 136. It should be appreciated that the bottle 100 shown in FIG. 1 is an example of an embodiment of a bottle, and is provided to illustrate associated components of the bottle 100. The illustrated bottle 100 and associated geometry is not intended to be limiting, but instead is provided to illustrate various components of the bottle 100. The preforms 200, 300, 400 disclosed herein can be configured to be blown, through blow-molding, to form any suitable or desired bottle geometry.

Figure 2:
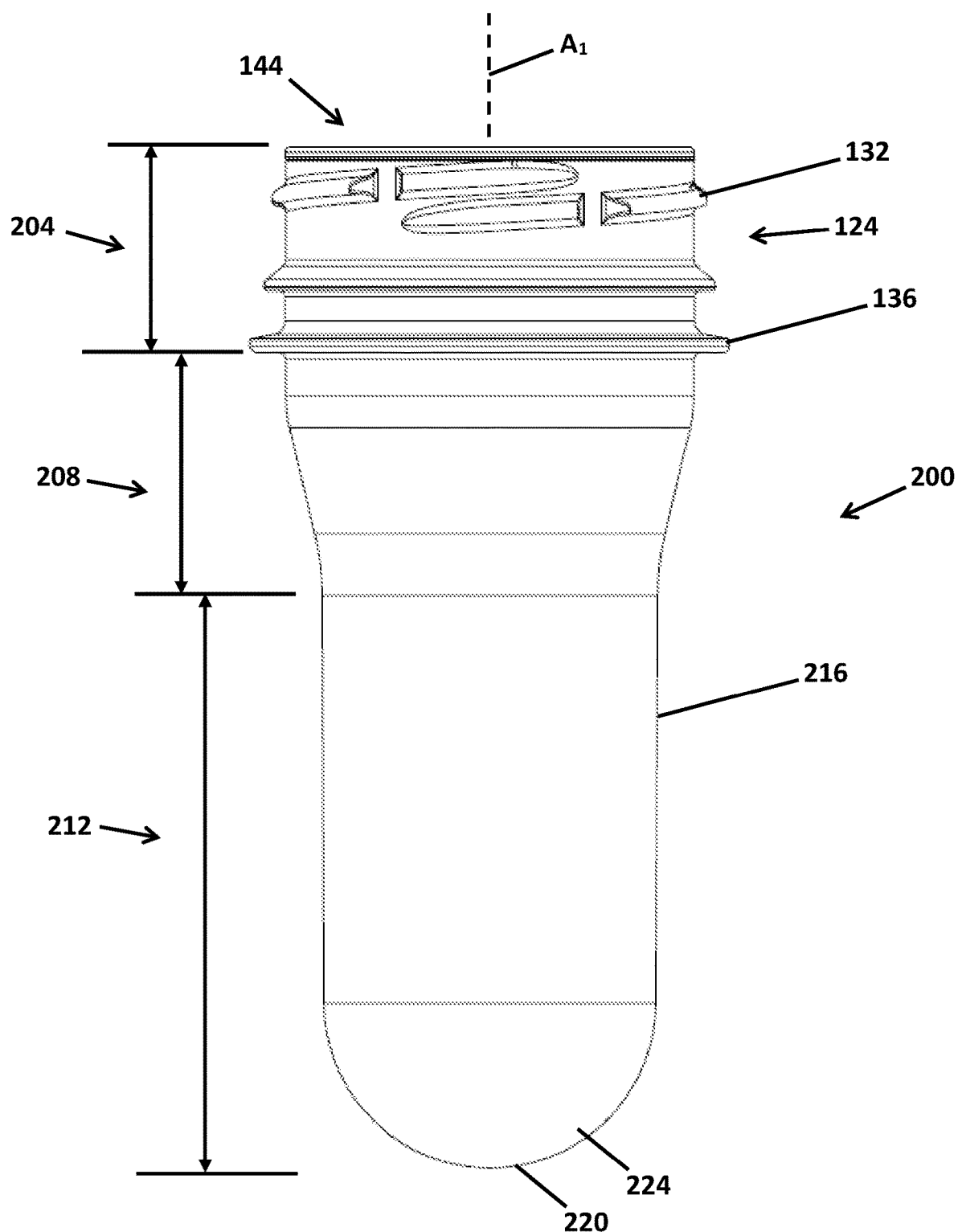
FIG. 2 is an elevation view of an example of an embodiment of a preform.
Figure 3:
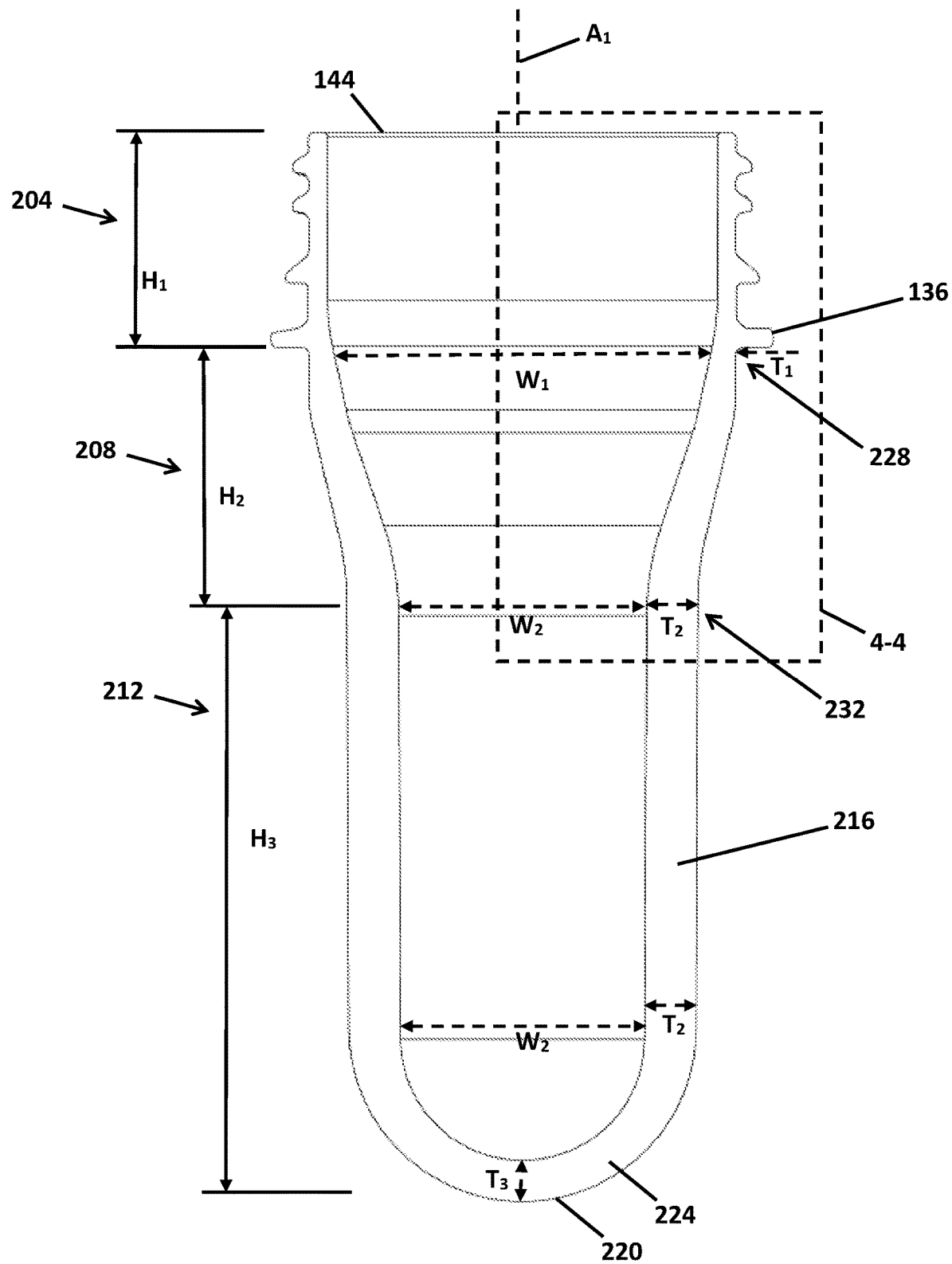
FIG. 3 is a cross-sectional view of the preform of FIG. 2.

With reference now to FIGS. 2-3, an example of an embodiment of a preform 200 is illustrated. The preform 200 has a generally tubular body with a hollow interior (or a hollow channel or a central). The preform 200 can be formed monolithically (i.e., as a single, or unitary, structure). The preform 200 includes three sections, a first section 204 (or a neck section 204 or a finish section 204), a second section 208 (or a transition section 208), and a third section 212 (or a body section 212). Unlike known preforms, the preform 200 concentrates more plastic material in the transition section 208. Shifting material to the transition section 208 provides greater strength of the blown bottle in this area. It should be appreciated that the transition section 208 defines the bell 116 of the blown bottle 100. In various embodiments, the transition section 208 can also define the shoulder 120 if the bottle 100. Accordingly, the additional material and associated greater strength provided to the bell 116 improves top load strength (i.e., resistance to crush along a longitudinal axis $A_1$) of the bottle 100. The additional material results in a thicker sidewall 216 in the transition section 208 of the preform 200 as compared to known preforms. Further, the additional material results in a heavier weight of the transition section 208 as compared to known preforms.

The neck section 204 is defined as the region between the opening 144 and a bottom (or base side) of the neck ring 136. The opening 144 is formed of a generally cylindrical portion of the neck section 204. The transition section 208 is defined as the region from the bottom (or base side) of the neck ring 136 to the body section 212. A sidewall 216 of the preform increases in thickness along the transition section 208. A cross-sectional diameter of the preform 200 also decreases in width along the transition section 208. The body section 212 is defined as the region from the transition section 208 to a base 220 (or a bottom 220 or an end cap 220) of the preform 200. The base 220 seals a bottom end of the tubular hollow interior. The sidewall 216 of the preform in the body section 212 maintains a constant thickness until reaching the base 220. The thickness of a preform wall 224 at the base is slightly narrower (or slightly less) than a thickness of the sidewall 216. It should be appreciated that the transition section 208 and the body section 212 can together be referred to as a preform body. During blow-molding, the neck section 204 does not change in shape. Stated another way, the neck section 204 is the same size in both the preform 200 and the finished bottle 100 (i.e., after blow-molding). The preform body is configured to be heated, and after heating, the preform body is configured to expand in response to blow-molding to form the bottle with the neck section 204.

With specific reference to FIG. 3, the neck section 204 has a first height $H_1$ (or a first length $H_1$). The transition section 208 has a second height $H_2$ (or a second length $H_2$). The body section 212 has a third height $H_3$ (or a third length $H_3$). The sum of the first, second, and third heights $H_1$, $H_2$, $H_3$ defines a total height (or a total length) of the preform 200.

Figure 4:
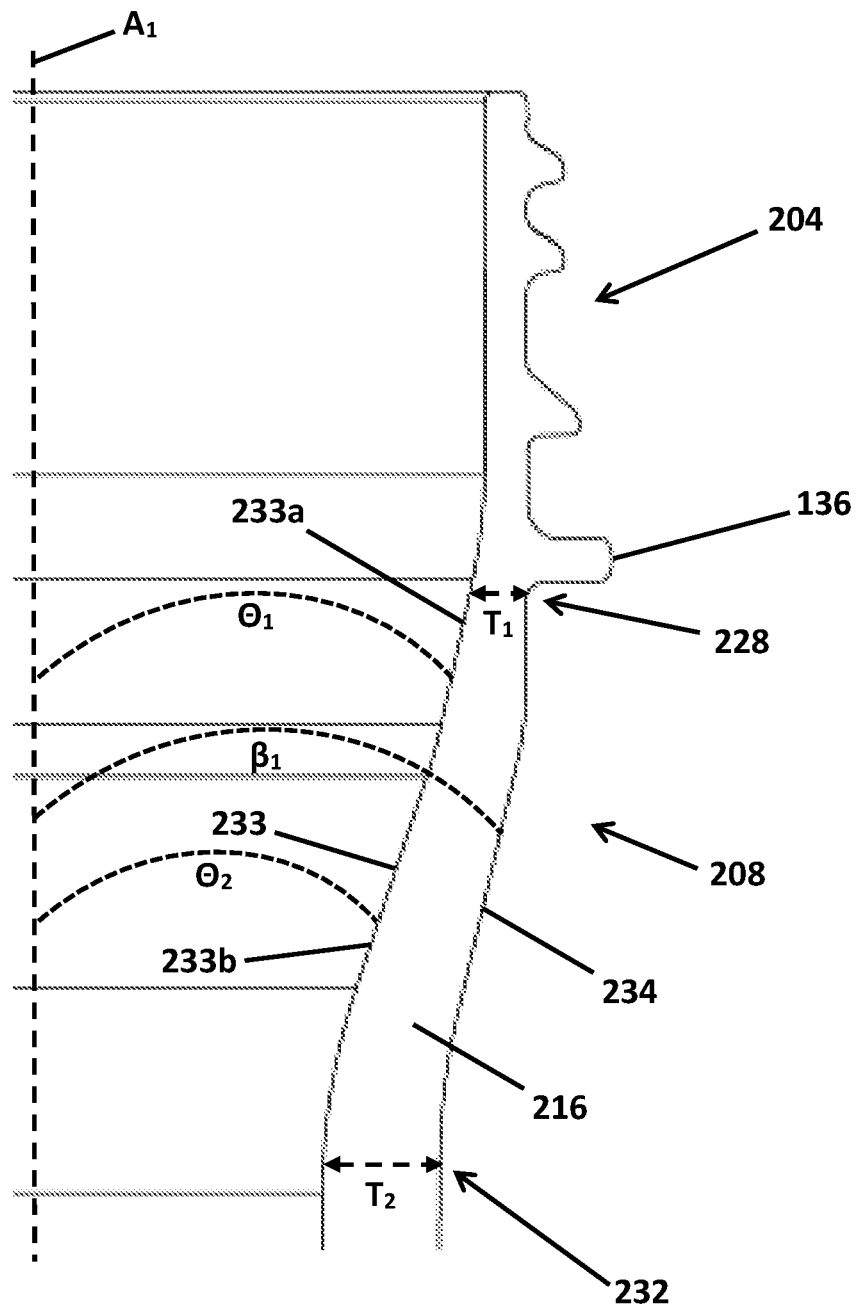
FIG. 4 is an enhanced cross-sectional view of the preform of FIG. 2, taken along line 4-4 of FIG. 3.

With reference now to FIGS. 3-4, the transition section 208 extends from a first end 228 to a second end 232. At the first end 228, the transition section 208 connects to the neck section 204. Stated another way, at the first end 228, the transition section 208 is positioned adjacent (or next to) the neck ring 136. At the second end 232, the transition section 208 connects to the body section 212. Stated another way, the body section 212 is positioned adjacent to the second end 232 of the transition section 208 and extends away from the transition section 208 to the enclosed base 220. The sidewall 216 at the second end 232 reaches a thickness that is maintained along a majority of the body section 212 to the base 220. At the first end 228, the sidewall 216 has a first thickness $T_1$. At the second end 232, the sidewall 216 has a second thickness $T_2$. The first thickness $T_1$ is less than the second thickness $T_2$. Stated another way, the second thickness $T_2$ is greater than the first thickness $T_1$. Thus, the sidewall 216 of the transition section 208 has a variable thickness from the first end 228 to the second end 232. It should be appreciated that the transition section 208 defines a frustoconical shape. In addition, the sidewall 216 maintains an increasing thickness from the first end 228 to the second end 232. Stated another way, from the first end 228 to the second end 232 of the transition section 208, the sidewall 216 does not decrease in thickness. Instead, it increases or maintains the thickness from the first end 228 to the second end 232 of the transition section 208.

With specific reference to FIG. 4, the transition section 208 includes an interior surface 233 of the sidewall 216 and an exterior surface 234 of the sidewall 216. The interior surface 233 is sloped (or tapered) inward towards the longitudinal axis $A_1$. It should be appreciated that the longitudinal axis $A_1$ is an imaginary line that defines a central axis of the preform 200. This central longitudinal axis $A_1$ extends from the opening 144 through the base 220 of the preform 200. The central longitudinal axis $A_1$ of the preform 200 is also the central longitudinal axis $A_1$ of the bottle 100. The interior surface 233 can be oriented to taper at a first angle $\Theta_1$ (or an interior angle $\Theta_1$ or a first interior angle $\Theta_1$). The first angle $\Theta_1$ can extend between the interior surface 233 and the central longitudinal axis $A_1$. It should be appreciated that the angle of the taper of the interior surface 233 can be adjusted or engineered to achieve certain performance characteristics in the blow-molded bottle. The angle of the taper of the interior surface 233 can also be adjusted to achieve different thicknesses to material in the sidewall 216 of the transition section 208. In some embodiments, the interior surface 233 can have a uniform taper that extends between the first and second ends 228, 232 of the transition section 208. With this geometry, the taper of the interior surface 233 can maintain a uniform first angle $\Theta_1$ along the interior surface 233 between the first and second ends 228, 232. In other examples of embodiments, the interior surface 233 can include a variable taper. Stated another way, the interior surface 233 can be separated into a plurality of surface portions, with each surface portion defining a different angle of taper of the interior surface 233. For example, a first surface portion 233a can be oriented to taper at the first angle $\Theta_1$, defined as the angle between the first surface portion 233a of the interior surface 233 and the central longitudinal axis $A_1$. A second surface portion 233b can be oriented to taper at a second angle $\Theta_2$ (or a second interior angle $\Theta_2$), defined as the angle between the second surface portion 233b of the interior surface 233 and the central longitudinal axis $A_1$. In embodiments with a plurality of tapers, the second angle $\Theta_2$ is greater than the first angle $\Theta_1$, as this facilitates the greater thickness of material at the second thickness $T_2$ at the second end 232 of the transition section 208. While FIG. 4 illustrates two different tapers of the interior surface 233 of the transition section 208, in other examples of embodiments the interior surface 233 of the transition section 208 can have three or more different tapers, with each consecutive portion of the interior surface 233 from the first end 228 to the second end 232 increasing in angle (defined between the central longitudinal axis $A_1$ and the associated portion of the interior surface 233) to facilitate additional material (or a greater thickness) in the sidewall 216 associated with the portion of the interior surface 233.

The exterior surface 234 is also sloped (or tapered) inward towards the longitudinal axis $A_1$. The exterior surface 234 can be oriented to taper at a first angle β (or an exterior angle β or a first exterior angle $β_1$). The first angle $β_1$ can extend between the exterior surface 234 and the central longitudinal axis $A_1$. It should be appreciated that the angle of the taper of the exterior surface 234 can be adjusted or engineered to achieve certain performance characteristics in the blow-molded bottle. The angle of the taper of the exterior surface 234 can also be adjusted to achieve different thicknesses to material in the sidewall 216 of the transition section 208. In some embodiments, the exterior surface 234 can have a uniform taper that extends between the first and second ends 228, 232 of the transition section 208. With this geometry, the taper of the exterior surface 234 can maintain a uniform first angle $β_1$ along the exterior surface 234 between the first and second ends 228, 232. In other examples of embodiments, the exterior surface 234 can include a variable taper. Stated another way, the exterior surface 234 can be separated into a plurality of surface portions, with each surface portion defining a different angle of taper of the exterior surface 234. For example, the exterior surface 234 can be divided into a first exterior surface portion oriented to taper at the first angle $β_1$, defined as the angle between the first surface portion of the exterior surface 234 and the central longitudinal axis $A_1$. A second surface portion can be oriented to taper at a second angle $β_2$ (not illustrated) defined as the angle between a second exterior surface portion of the exterior surface 234 and the central longitudinal axis $A_1$. In embodiments with a plurality of tapers, the second angle $β_2$ is greater than the first angle $β_1$, as this facilitates the greater thickness of material at the second thickness $T_2$ at the second end 232 of the transition section 208. In other examples of embodiments, the exterior surface 234 of the transition section 208 can have three or more different tapers, with each consecutive portion of the exterior surface 234 from the first end 228 to the second end 232 increasing in angle (defined between the central longitudinal axis $A_1$ and the associated portion of the exterior surface 234) to facilitate additional material (or a greater thickness) in the sidewall 216 associated with the portion of the exterior surface 234.

A cross-sectional width (or cross-sectional diameter) of the hollow interior of the preform 200 in the transition section 208 decreases from the first end 228 to the second end 232. With reference back to FIG. 3, a first cross-sectional width $W_1$ of the preform 200 at the first end 228, as measured between the interior surfaces 233 of the opposing sidewalls 216, is greater than a second cross-sectional width $W_2$ of the preform 200 at the second end 232, as measured between the interior surfaces 233 of the opposing sidewalls 216.

The body section 212 has a generally cylindrical cross-sectional shape from the transition section 208 to the base 220. As shown in FIG. 3, the sidewall 216 in the body section 212 maintains the second thickness $T_2$ from the second end 232 of the transition section 208 to the base 220. Similarly, the body section 212 has a cross-sectional width (or diameter), as measured between an interior surface of the opposing sidewalls 216, that is maintained as the second cross-sectional width $W_2$.

The wall 224 at the base 220 decreases in thickness relative to the relative to the sidewall 216 of the body section 212. The wall 224 of the base 220 has a third thickness $T_3$. The third thickness $T_3$ is less than the second thickness $T_2$. It should be appreciated that the body section 212 of the preform 200, and more specifically the sidewall 216 of the body section 212, defines the sidewall 108 of the bottle 100. In addition, it should be appreciated that the base 220 of the preform 200 defines the base 104 of the blown bottle 100. In some examples of embodiments, the base 220 can be conical, frustoconical, or hemispherical in shape. In yet other examples of embodiments, a terminus of the base 220 can be flattened or rounded.

In addition to the additional material leading to a thicker sidewall 216 in the transition section 208, the weight of the transition section 208 is greater than in known preforms. In known preforms, the transition section generally accounted for approximately 10% to 15% of the total weight of the preform. In the preform 200, the transition section 208 accounts for 20% or more of the total weight of the preform. Stated another way, the transition section 208 of the preform 200 accounts for approximately 20% to approximately 30% of the total weight of the preform 200. It should be appreciated that the weight is provided in the sidewall 216 of the transition section 208.

The preform 200 and associated geometry can be adapted for different preform sizes and weights. The preform size and weight can be selected based on the desired size and volume of the blow-molded bottle 100. The preform 200 can have a total preform weight of approximately 17.0 grams (g) to approximately 35.0 grams (g). These preform sizes are configured to be blow-molded into a bottle 100 that has a volume of approximately 12.0 ounces (oz.) to approximately 28.0 ounces (oz.).

In one example of an embodiment of the preform 200, the preform 200 can have a total weight of 17.42 g. In this embodiment, the preform 200 can have a total height (or a total length) of 73.0 millimeters (mm). The neck section 204 can have a first height $H_1$ of 14.90 mm. The transition section 208 can have a second height $H_2$ of 15.07 mm. The body section 212 has a third height $H_3$ of 43.03 mm. The sidewall 216 of the transition section 208 of the preform 200 can have a first thickness $T_1$ at the first end 228 of 1.29 mm and a second thickness $T_2$ at the second end 232 of 3.85 mm. The sidewall 216 of the body section 212 has the second thickness $T_2$ of 3.85 mm. The wall 224 of the base 220 has a third thickness $T_3$ of 2.68 mm. The interior surface 233 of the transition section 208 has a first interior angle $\Theta_1$ of 26.067°. The exterior surface 234 of the transition section 208 has a first exterior angle $β_1$ of 16.60°. The transition section 208 has a first cross-sectional width $W_1$ of 26.91 mm, and a second cross-sectional width $W_2$ of 16.38 mm. The body section 212 has the second cross-sectional width $W_2$ of 16.38 mm. The preform has a weight distribution of the neck section 204 weighing 3.13 grams (g), the transition section 208 weighing 3.95 g, and the body section 212 weighing 10.34 g. As a percentage of weight, the neck section 204 is 18.00% of the total weight of the preform 200, the transition section 208 is 22.70% of the total weight of the preform 200, and the body section 212 is 59.30% of the total weight of the preform 200.

In another example of an embodiment of the preform 200, the preform 200 can have a total weight of 20.27 g. In this embodiment, the preform 200 can have a total height (or a total length) of 74.0 millimeters (mm). The neck section 204 can have a first height $H_1$ of 14.90 mm. The transition section 208 can have a second height $H_2$ of 15.33 mm. The body section 212 has a third height $H_3$ of 43.77 mm. The sidewall 216 of the transition section 208 of the preform 200 can have a first thickness $T_1$ at the first end 228 of 1.75 mm and a second thickness $T_2$ at the second end 232 of 3.56 mm. The sidewall 216 of the body section 212 has the second thickness $T_2$ of 3.56 mm. The wall 224 of the base 220 has a third thickness $T_3$ of 2.85 mm. The first surface portion 233a of the interior surface 233 of the transition section 208 has a first interior angle $\Theta_1$ of 11.8667°, and the second surface portion 233b of the interior surface 233 of the transition section 208 has a second interior angle $\eta_2$ of 18.483°. The exterior surface 234 of the transition section 208 has a first exterior angle $\beta_1$ of 13.31667°. The transition section 208 has a first cross-sectional width $W_1$ of 26.85 mm, and a second cross-sectional width $W_2$ of 17.16 mm. The body section 212 has the second cross-sectional width $W_2$ of 17.16 mm. The preform has a weight distribution of the neck section 204 weighing 3.21 grams (g), the transition section 208 weighing 5.07 g, and the body section 212 weighing 11.99 g. As a percentage of weight, the neck section 204 is 15.8% of the total weight of the preform 200, the transition section 208 is 25.0% of the total weight of the preform 200, and the body section 212 is 59.2% of the total weight of the preform 200.

In another example of an embodiment of the preform 200, the preform 200 can have a total weight of 21.91 g. In this embodiment, the preform 200 can have a total height (or a total length) of 79.9 millimeters (mm). The neck section 204 can have a first height $H_1$ of 15.70 mm. The transition section 208 can have a second height $H_2$ of 17.78 mm. The body section 212 has a third height $H_3$ of 46.42 mm. The sidewall 216 of the transition section 208 of the preform 200 can have a first thickness $T_1$ at the first end 228 of 1.29 mm and a second thickness $T_2$ at the second end 232 of 3.54 mm. The sidewall 216 of the body section 212 has the second thickness $T_2$ of 3.54 mm. The wall 224 of the base 220 has a third thickness $T_3$ of 2.84 mm. The interior surface 233 of the transition section 208 has a first interior angle $\Theta_1$ of 33.333°. The exterior surface 234 of the transition section 208 has a first exterior angle $\beta_1$ of 25.5667°. The transition section 208 has a first cross-sectional width $W_1$ of 33.30 mm, and a second cross-sectional width $W_2$ of 17.22 mm. The body section 212 has the second cross-sectional width $W_2$ of 17.22 mm. The preform has a weight distribution of the neck section 204 weighing 4.07 grams (g), the transition section 208 weighing 6.08 g, and the body section 212 weighing 11.76 g. As a percentage of weight, the neck section 204 is 18.60% of the total weight of the preform 200, the transition section 208 is 27.70% of the total weight of the preform 200, and the body section 212 is 53.70% of the total weight of the preform 200.

In another example of an embodiment of the preform 200, the preform 200 can have a total weight of 24.99 g. In this embodiment, the preform 200 can have a total height (or a total length) of 85.0 millimeters (mm). The neck section 204 can have a first height $H_1$ of 15.70 mm. The transition section 208 can have a second height $H_2$ of 19.19 mm. The body section 212 has a third height $H_3$ of 50.11 mm. The sidewall 216 of the transition section 208 of the preform 200 can have a first thickness $T_1$ at the first end 228 of 1.34 mm and a second thickness $T_2$ at the second end 232 of 3.64 mm. The sidewall 216 of the body section 212 has the second thickness $T_2$ of 3.64 mm. The wall 224 of the base 220 has a third thickness $T_3$ of 2.91 mm. The interior surface 233 of the transition section 208 has a first interior angle $\Theta_1$ of 28.41667°. The exterior surface 234 of the transition section 208 has a first exterior angle $\beta_1$ of 20.45°. The transition section 208 has a first cross-sectional width $W_1$ of 33.30 mm, and a second cross-sectional width $W_2$ of 18.55 mm. The body section 212 has the second cross-sectional width $W_2$ of 18.55 mm. The preform has a weight distribution of the neck section 204 weighing 4.07 grams (g), the transition section 208 weighing 6.45 g, and the body section 212 weighing 14.47 g. As a percentage of weight, the neck section 204 is 16.3% of the total weight of the preform 200, the transition section 208 is 25.80% of the total weight of the preform 200, and the body section 212 is 57.90% of the total weight of the preform 200.

In another example of an embodiment of the preform 200, the preform 200 can have a total weight of 29.01 g. In this embodiment, the preform 200 can have a total height (or a total length) of 95.0 millimeters (mm). The neck section 204 can have a first height $H_1$ of 15.70 mm. The transition section 208 can have a second height $H_2$ of 21.05 mm. The body section 212 has a third height $H_3$ of 58.25 mm. The sidewall 216 of the transition section 208 of the preform 200 can have a first thickness $T_1$ at the first end 228 of 1.34 mm and a second thickness $T_2$ at the second end 232 of 3.76 mm. The sidewall 216 of the body section 212 has the second thickness $T_2$ of 3.76 mm. The wall 224 of the base 220 has a third thickness $T_3$ of 3.01 mm. The interior surface 233 of the transition section 208 has a first interior angle $\Theta_1$ of 28.7333°. The exterior surface 234 of the transition section 208 has a first exterior angle $\beta_1$ of 21.0833°. The transition section 208 has a first cross-sectional width $W_1$ of 33.29 mm, and a second cross-sectional width $W_2$ of 17.98 mm. The body section 212 has the second cross-sectional width $W_2$ of 17.98 mm. The preform has a weight distribution of the neck section 204 weighing 4.07 grams (g), the transition section 208 weighing 7.29 g, and the body section 212 weighing 17.65 g. As a percentage of weight, the neck section 204 is 14.00% of the total weight of the preform 200, the transition section 208 is 25.10% of the total weight of the preform 200, and the body section 212 is 60.90% of the total weight of the preform 200.

In another example of an embodiment of the preform 200, the preform 200 can have a total weight of 35.05 g. In this embodiment, the preform 200 can have a total height (or a total length) of 96.0 millimeters (mm). The neck section 204 can have a first height $H_1$ of 15.70 mm. The transition section 208 can have a second height $H_2$ of 22.92 mm. The body section 212 has a third height $H_3$ of 57.38 mm. The sidewall 216 of the transition section 208 of the preform 200 can have a first thickness $T_1$ at the first end 228 of 1.34 mm and a second thickness $T_2$ at the second end 232 of 3.74 mm. The sidewall 216 of the body section 212 has the second thickness $T_2$ of 3.74 mm. The wall 224 of the base 220 has a third thickness $T_3$ of 2.99 mm. The first surface portion 233a of the interior surface 233 of the transition section 208 has a first interior angle $\Theta_1$ of 18.35°, and the second surface portion 233b of the interior surface 233 of the transition section 208 has a second interior angle $\Theta_2$ of 12.60°. The exterior surface 234 of the transition section 208 has a first exterior angle $\beta_1$ of 9.20°. The transition section 208 has a first cross-sectional width $W_1$ of 33.32 mm, and a second cross-sectional width $W_2$ of 22.89 mm. The body section 212 has the second cross-sectional width $W_2$ of 22.89 mm. The preform has a weight distribution of the neck section 204 weighing 4.07 grams (g), the transition section 208 weighing 9.16 g, and the body section 212 weighing 21.82 g. As a percentage of weight, the neck section 204 is 11.60% of the total weight of the preform 200, the transition section 208 is 26.10% of the total weight of the preform 200, and the body section 212 is 62.30% of the total weight of the preform 200.

While the examples above provide examples of embodiments of certain dimensions of the preform 200, the preform 200 can have a range of certain weights and/or dimensions. For example, the preform 200 can have a preform weight (or total weight) in the range of approximately 17.0 g to approximately 35.05 g. The bottles blow-molded from these preforms 200 can have a volume in a range of approximately 12.0 oz. to approximately 28.0 oz. in size. The preform 200 can have a total height (or a total length) in a range of approximately 70.00 mm to approximately 99.0 mm, and more specifically approximately 71.50 mm to approximately 97.50 mm, and more specifically approximately 73.00 mm to approximately 96.00 mm. The neck section 204 can have a height $H_1$ in a range of approximately 13.50 mm to approximately 17.50 mm, and more specifically of approximately 14.00 mm to approximately 16.50 mm, and more specifically of approximately 14.90 mm to approximately 15.70 mm. The transition section 208 can have a second height $H_2$ in a range of approximately 14.00 mm to approximately 24.00 mm, and more specifically of approximately 15.00 mm to approximately 23.00 mm, and more specifically of approximately 15.07 mm to approximately 22.92 mm. The body section 212 has a third height $H_3$ in a range of approximately 40.00 mm to approximately 62.00 mm, and more specifically of approximately 42.00 mm to approximately 59.00 mm, and more specifically of approximately 43.03 mm to approximately 58.25 mm. The sidewall 216 of the transition section 208 of the preform 200 can have a first thickness $T_1$ at the first end 228 in a range of approximately 1.20 mm to approximately 1.90 mm, and more specifically of approximately 1.25 mm to approximately 1.85 mm, and more specifically of approximately 1.25 mm to approximately 1.80 mm, and more specifically of approximately 1.29 mm to approximately 1.75 mm. The sidewall 216 of the transition section 208 of the preform 200 can have a second thickness $T_2$ at the second end 232 in a range of approximately 3.30 mm to approximately 4.00 mm, and more specifically of approximately 3.30 mm to approximately 3.95 mm, and more specifically of approximately 3.35 mm to approximately 3.95 mm, and more specifically of approximately 3.35 mm to approximately 3.90 mm, and more specifically of approximately 3.40 mm to approximately 3.90 mm, and more specifically of approximately 3.45 mm to approximately 3.90 mm, and more specifically of approximately 3.50 mm to approximately 3.90 mm, and more specifically of approximately 3.54 mm to approximately 3.85 mm. The preform 200 can have a weight distribution of the neck section 204 in the range of approximately 2.90 g to approximately 4.50 g, and more specifically of approximately 3.00 g to approximately 4.20 g, and more specifically of approximately 3.13 g to approximately 4.07 g. The preform 200 can have a weight distribution of the transition section 208 in the range of approximately 3.50 g to approximately 10.50 g, and more specifically of approximately 3.75 g to approximately 9.50 g, and more specifically of approximately 3.95 g to approximately 9.16 g. The preform 200 can have a weight distribution of the body section 212 in the range of approximately 12.50 g to approximately 23.50 g, and more specifically of approximately 11.00 g to approximately 22.50 g, and more specifically of approximately 10.34 g to approximately 21.82 g.

As a percentage of weight, the preform 200 can have a weight distribution of the neck section 204 in the range of approximately 9.50% to approximately 20.0% of the total weigh to of the preform 200, and more specifically of approximately 10.5% to approximately 19.0% of the total weigh to of the preform 200, and more specifically of approximately 11.60% to approximately 18.60% of the total weigh to of the preform 200.

The preform 200 can have a weight distribution of the transition section 208 in the range of approximately 20.0% to approximately 40.0% of the total weight of the preform 200, and more specifically approximately 20.0% to approximately 30.0% of the total weight of the preform 200, and more specifically approximately 20.0% to approximately 28.0% of the total weight of the preform 200, and more specifically approximately 22.0% to approximately 28.0% of the total weight of the preform 200.

The preform 200 can have a weight distribution of the body section 212 in the range of approximately 45.0% to approximately 65.0% of the total weight of the preform 200, and more specifically approximately 50.0% to approximately 65.0% of the total weight of the preform 200, and more specifically approximately 52.0% to approximately 62.50% of the total weight of the preform 200, and more specifically approximately 53.5% to approximately 62.5% of the total weight of the preform 200.

The preform 200 can also include a circumferential stretch ratio (CSR), defined by the largest diameter of the blow-molded bottle 100 divided by the smallest diameter of the preform 200, that is between 3.5 and 5.0. In other examples of embodiments, the preform 200 can include a CSR that is above or below the range described above. In addition, the preform 200 can includes an axial stretch ratio (ASR) defined by a first distance of the bottle 100, taken along an exterior surface of the bottle 100 from the neck 128 to the base 104, divided by a second distance of the preform 200, taken along an exterior surface of the preform 200 between the neck ring 136 to a position where the body portion 212 converges into the base 220, that is between 2.5 and 3.5. In other examples of embodiments, the preform 200 can include an ASR that is above or below the range described above.

The preform 200 described above has certain advantages. Providing a greater distribution of material in the transition section 208 of the preform 200 results in improved performance when the preform 200 is blow-molded into the bottle 100. The bell 116 of the bottle 100, which is formed by the transition section 208 in response to blow-molding, is strengthened by the additional material distributed to the transition section 208 of the preform 200. Specifically, a greater distribution of material (plastic) into the transition section 208, and towards the top of the preform 200, allows the bottle 100 to increase in strength and support greater weight. For example, the bottle 100 is more resistant to bending or deformation when stacked on pallets that may include multiple levels of bottles 100.

Although the disclosure has been described in detail with reference to certain preferred embodiments, variations and modifications exist within the scope and spirit of one or more independent aspects of the disclosure as described.

What is claimed is:

1. A preform configured to be blow-molded into a plastic bottle comprising:

a neck section defining an opening, the neck section including a threaded portion configured to engage a closure, and a neck ring;

a transition section having a first end positioned adjacent to the neck ring and a second end opposite the first end;

a cylindrical body section extending from the second end of the transition section to a base; and a longitudinal axis extending from the opening through the base, wherein the neck section, transition section, and the body section define a hollow channel positioned between the opening and the base, wherein the transition section defines a tapered sidewall relative to the longitudinal axis, the tapered sidewall decreases a cross-sectional diameter of the hollow channel, and wherein the tapered sidewall of the transition section contains 20% to 30% of a total weight of the preform.

2. The preform of claim 1, wherein a total weight of the preform is in a range of 17.00 grams to 35.05 grams.

3. The preform of claim 1, wherein the tapered sidewall of the transition section increases in thickness from the first end to the second end.

4. The preform of claim 3, wherein the sidewall of the transition section at the first end has a first thickness in a range of 1.25 mm to 1.85 mm.

5. The preform of claim 3, wherein the sidewall of the transition section at the second end has a second thickness in a range of 3.30 mm to 3.95 mm.

6. The preform of claim 3, wherein a sidewall of the cylindrical body section has the same thickness as the sidewall of the transition section at the second end.

7. The preform of claim 6, wherein a sidewall of the base has a thickness less than the sidewall of the cylindrical body section.

8. The preform of claim 1, wherein the neck section, body section, and the base contain 70% to 80% of the total weight of the preform.

9. The preform of claim 1, wherein the tapered sidewall defines a variable thickness from the first end to the second end.

10. The preform of claim 9, wherein the tapered sidewall has a first thickness at the first end and a second thickness at the second end, the second thickness being greater than the first thickness.

11. The preform of claim 10, wherein the first thickness is in a range of 1.25 mm to 1.85 mm.

12. The preform of claim 10, wherein the second thickness is in a range of 3.30 mm to 3.95 mm.

13. The preform of claim 12, wherein a sidewall of the cylindrical body section has the second thickness.

14. The preform of claim 10, wherein the second thickness is in a range of 3.40 mm to 3.95 mm.

15. The preform of claim 14, wherein a sidewall of the cylindrical body section has the second thickness.

16. A preform for producing a plastic bottle comprising:

a tubular body defining a hollow interior, the body defining the following components in sequence:

a finish section defining an opening and a threaded portion;

a neck ring;

a transition section having a first end positioned adjacent to the neck ring and a second end opposite the first end; and a cylindrical body section extending from the second end of the transition section to a base, the base sealing the body at an end opposite the opening;

a longitudinal axis extending from the opening through the base, wherein the transition section defines a tapered sidewall relative to the longitudinal axis, the tapered sidewall decreases a cross-sectional diameter of the hollow interior, wherein the tapered sidewall of the transition section contains more than 20% of a total weight of the preform, and wherein a sidewall of the base has a thickness less than a sidewall of the cylindrical body section.

17. The preform of claim 16, wherein the tapered sidewall of the transition section contains 20% to 40% of the total weight of the preform.

18. The preform of claim 16, wherein the tapered sidewall of the transition section contains 20% to 30% of the total weight of the preform.

19. The preform of claim 16, wherein the tapered sidewall increases in thickness from the first end to the second end.

20. The preform of claim 19, wherein the tapered sidewall has a thickness in a range of 3.30 mm to 3.95 mm at the second end.

* * * * *